Feb. 17, 1931.  G. MAEHREN  1,793,370
RELEASABLE WINDSHIELD
Filed Feb. 18, 1928   3 Sheets-Sheet 1

INVENTOR
George Maehren
BY
Francis H. Davis.
ATTORNEY

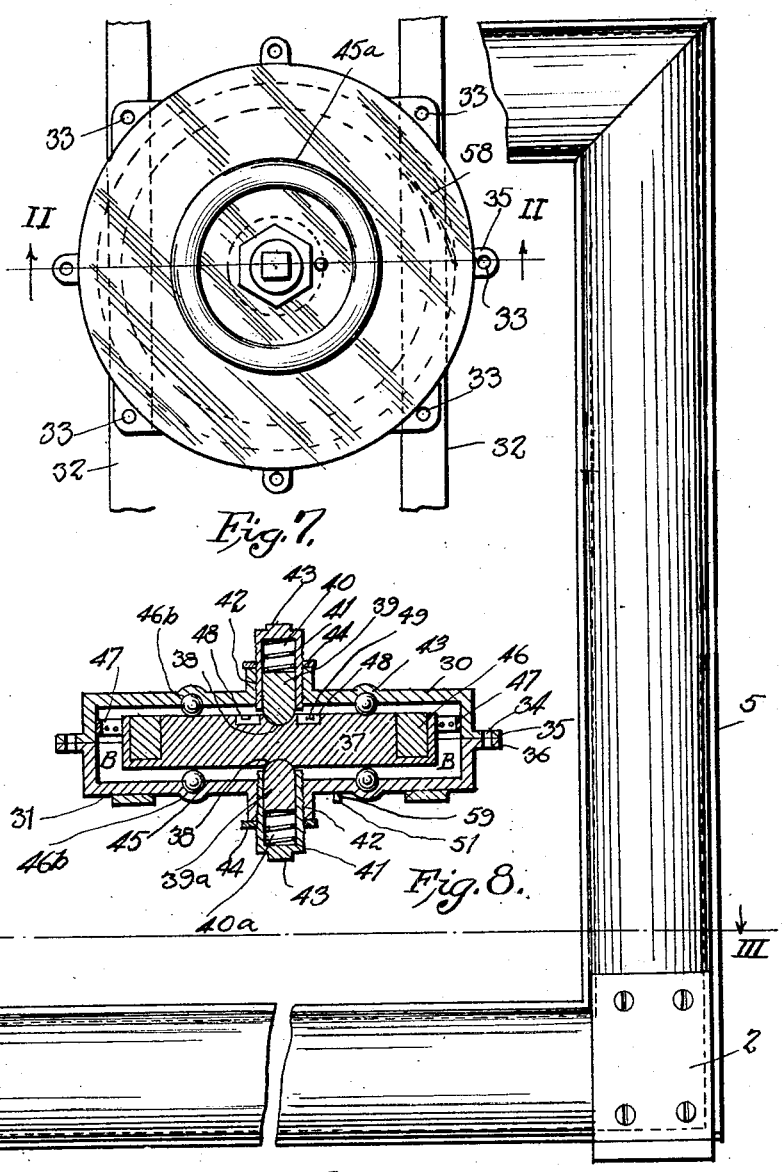
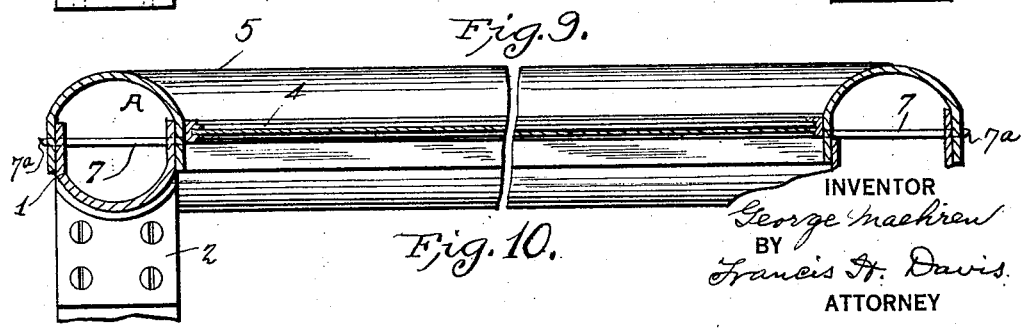

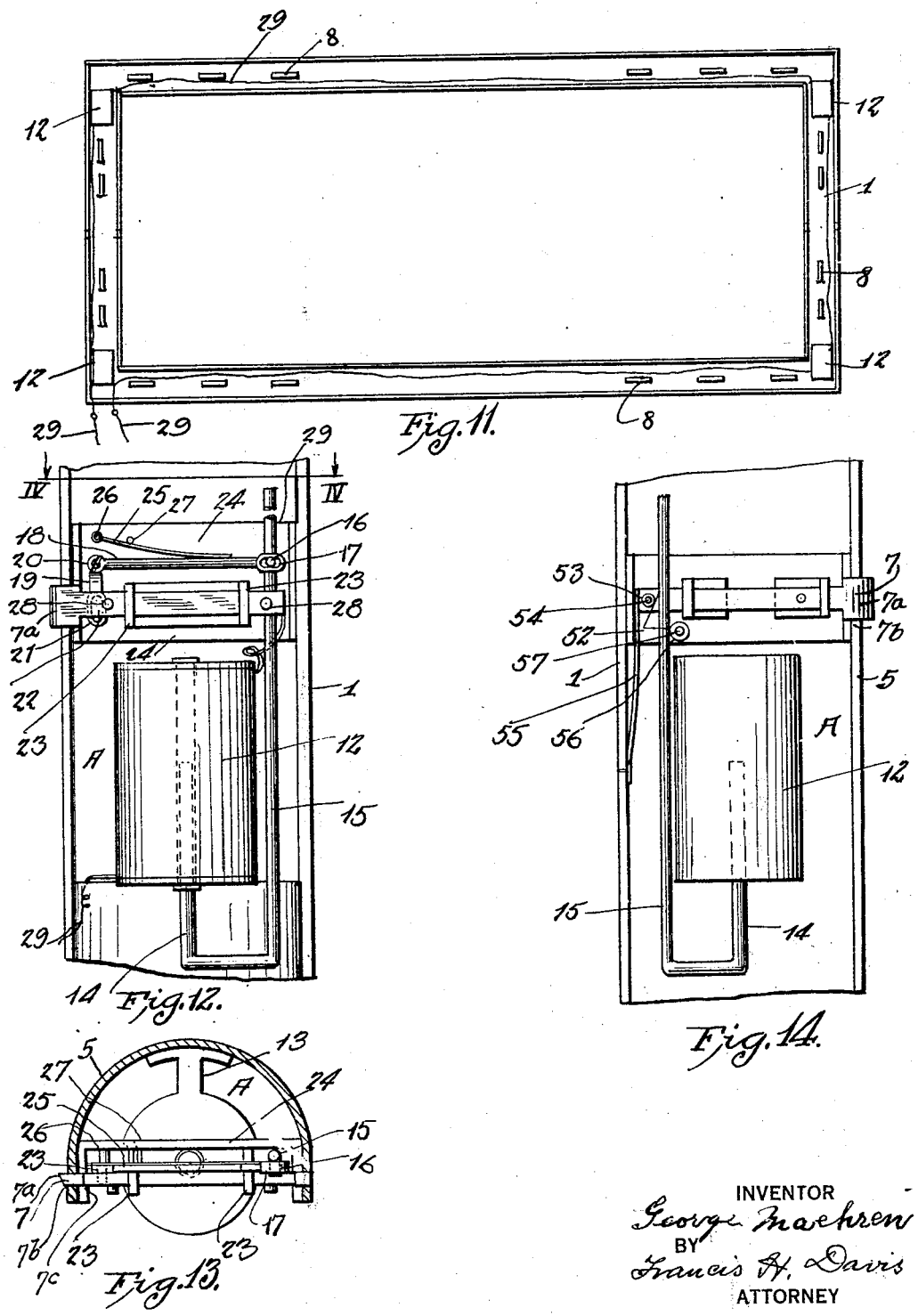

Patented Feb. 17, 1931

1,793,370

UNITED STATES PATENT OFFICE

GEORGE MAEHREN, OF PACIFIC GROVE, CALIFORNIA, ASSIGNOR OF ONE-HALF TO ROCCO ELIO, OF MONTEREY, CALIFORNIA

RELEASABLE WINDSHIELD

Application filed February 18, 1928. Serial No. 255,322.

This invention relates to releasable or safety windshields and has for its principal object the provision of a windshield that in event of accident will be released from its normal position and thus prevent occupants being thrown against it at risk of injury.

A further object is to provide means for such release, and means for controlling said release means.

This invention arises from the urgent need of protection for occupants of automotive vehicles in such cases as when vehicles moving in opposite directions collide, or when brought to a sudden standstill by an opposing obstacle. In all such cases the sudden halt tends to throw the occupants forward against the glass windshield frequently with such violent force as to break the glass to shivers, thereby jeopardizing the lives of the victims.

Whereas, by the use of this novel invention the instant the car receives a sudden jolt in any horizontal direction the windshield is thrown forward out of its frame leaving a harmless space for occupants to encounter instead of dangerous glass.

These objects are attained generally by the form, material and construction of the parts employed and the use of electric and magnetic energy as will hereinafter appear, together with other advantages that will become apparent as the specification unfolds.

In the drawings:—

Fig. 7 is a plan of the controller.

Fig. 8 is a section through Fig. 7 taken on the line II—II.

Fig. 9 is an enlarged view of the supporting structure as viewed from within.

Fig. 10 is a section through Fig. 3 taken on the line I—I.

Fig. 11 is an inside view of supporting frame showing interrelated positions of springs and solenoids.

Fig. 12 is an enlarged detail elevation of the solenoid and latch element.

Fig. 13 is a plan of Fig. 12 taken on the line IV—IV of Fig. 12.

Fig. 14 shows a changed form of latch.

Like reference characters refer to like parts throughout the several views.

The windshield structure

Figure 1:
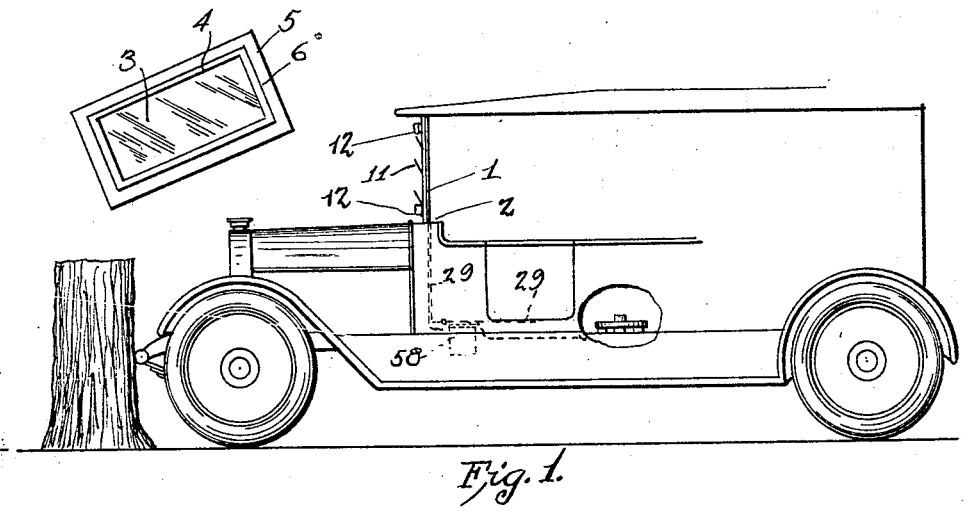
Figure 1 shows a car in collision and the windshield flying away.

Referring to the drawings, the numeral 1 denotes the relatively stationary supporting frame which is secured to the vehicle (hereafter termed the car) by means of the angles 2.

The windshield glass 3 is mounted in the frame 4 which is pivoted to the releasable frame 5 by the bolt means 6. Said frame 5 cups over the frame 1 in the manner well shown in Fig. 10, and is secured thereto by the four latches 7 as shown in Figs. 12 and 13 thus including the tubular space A all round within said frames when engaged by said latches.

There are preferably four of the latches 7, each being adapted to coact with a solenoid 12, as will later appear, said latches being relatively disposed to said solenoids as shown diagrammatically in Figure 11. Figures 12 and 14 show elevational views of said latches and Figure 13 shows a top view thereof as the latch would appear looking down on it from the line IV—IV of Figure 12.

The latches 7 are carried by the bearing pieces 24, said bearings being secured to the inner side of the supporting frame 1 by "spot welding" or in other suitable manner, each latch being provided with the suitably beveled portion 7a that is adapted to slip inwardly when pressed upon from the outside, as does the latch of an ordinary door-lock. The frame 1 is provided with the opening 7b which is adapted for passage therethrough of the latch 7 whereas, the similar, registering guide hole 7c is provided in the frame 1.

The spring 55, well shown in Figure 14, serves as a keeper, so that when both said frames are brought together, as shown in Figure 10, said latches will engage the frame 5 with the frame 1 and fasten the two together until such time as said latches are retracted by the energizing of the solenoids in the manner described.

Figures 3, 5, 6:
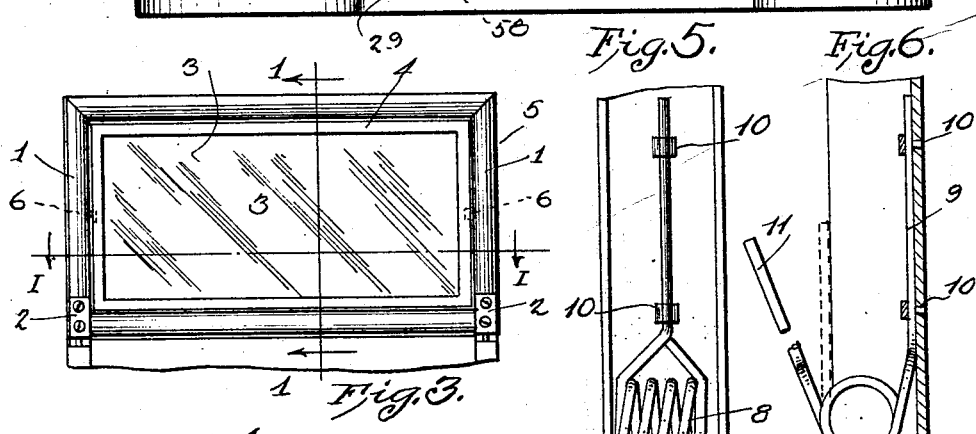
Fig. 3 shows an inside elevational view of my windshield.
Fig. 5 shows an elevation detail of a spring.
Fig. 6 shows the spring of Fig. 5 as viewed at a right angle.
Figure 4:
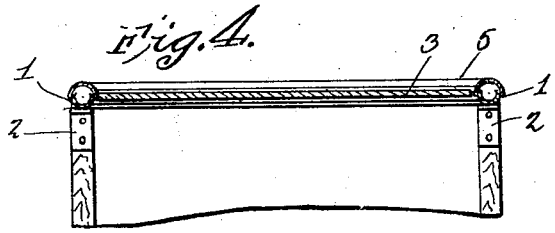
Fig. 4 shows a sectional plan taken on the line I—I of Fig. 3.

Within the frame 1 are a series of springs 8, (indicated diagrammatically in Figure 11) and shown in detail in Figures 5 and 6, wherein the limbs 9 thereof are secured axially to the concavity of said frames either by rivet means as 10 or in other suitable manner, said springs being normally set so that the limbs 11 thereof project a suitable distance outwardly beyond said frame 1 as is well shown in Figure 6. It follows that with a stiff spring so set considerable force is required to press the limb 11 inwardly to the position indicated by the dotted lines in said figure. Said limb when so pressed in, upon sudden release would exert a strong outward propulsive force.

Therefore, a plurality of such springs so disposed in the frame 1 would require considerable force to be exerted on said frame 5 in order to snap the said latches into their corresponding keeper-holes so as to bind said frames together. But when said frame 5 is so attached to the frame 1 the latent force of the springs 8 under collective compression is sufficient to cause said frame 5 carrying the glass 3 to be impelled away form the car in a forward direction instantly upon simultaneous release of said latches.

Within said space A preferably disposed adjacent the corners thereof, as is well indicated in Fig. 11, are the four solenoids 12, that are rigidly attached to the inner sides of the frame 1 by means of the member 13.

The solenoid elements are adapted to coact with the latch members 7 for their simultaneous release, as will later appear, being provided with the armatures 14 that are adapted to be raised and lowered by magneto-motive-force. The members 15 being provided with the pins 16 which engage the slots 17 of the longer arm 18 of the bell-crank 18—19, said crank being pivoted at 20, and the member 19 making slotted engagement at 21 with the pin 22 carried on the inner side of the horizontally-moveable latches 7, said latches being slidably mounted in the lugs 23 that are well shown in Fig. 13 as being punched forward from bearing-piece 24 and suitably perforated to accommodate said latches 7. Said arm 18 being provided with the pressure springs 25 secured to piece 24 by the screw 26 and provided with the abutment pin 27. The latches 7 being provided further with the stop means 28—28 adapted to regulate the throw of said latches either to right or left. Said solenoids being connected in series by the wires 29 disposed within the space A and leading to the controlling device now about to be explained.

*The controlling device*

Figure 2:
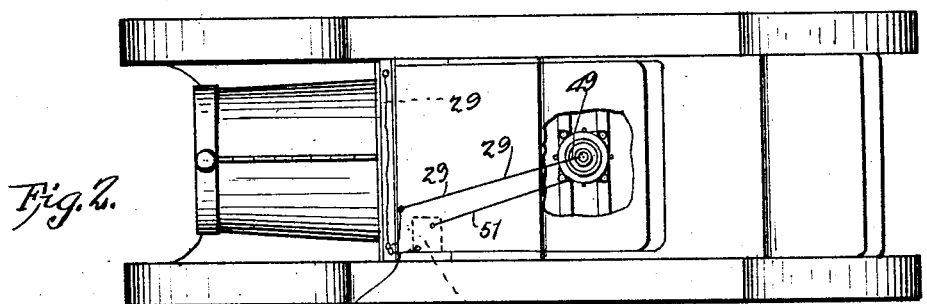
Fig. 2 shows a car in plan.

This important element of my invention is illustrated in detail in Figs. 7 and 8 whereas, its interrelation to the other component parts of the invention are well indicated in general in Figs. 1 and 2.

The upper and lower casing members are respectively 30 and 31, the latter is secured to the bed-pieces 32—32 by the bolts 33—33; whereas, the upper member 30 fastens to the lower member by the bolts 34 passing through the companion lugs 35 and 36, thus forming the interior space B partially occupied by the controller disc 37, Fig. 8, which is normally disposed concentrically within said casing. At the center of said disc on both sides thereof are the cup-shaped depressions 38—38 which are adapted to receive the rounded end of the centering members 39 and 39a, said members being socketed a working fit within the socket members 40—40 and adapted for axial displacement therein under pressure applied to the springs 41—41 by screwing said sockets in or out of the female-threaded openings 42—42, the outer surface of a suitably engaging portion of said sockets being male-threaded to correspond, being provided with the bosses 43 for accommodation of a wrench, and with the lock-nuts 44 to maintain said adjustments.

Both said upper and lower casings are provided internally with the ball-races 45—45 which may or may not show in relief on the outer surfaces thereof as 45a.

Within said races a series of balls 46b is contained and so adjusted as to form anti-friction surfaces for easy movement of said disc 37 when being traversed out of concentricity.

Said disc is preferably an iron casting weighted with the inserted ring of lead 46. Springs as 47 are provided to prevent free rotation of said disc within the space B, said springs being preferably attached to the inner wall of the space and being formed so as to hug the outer rim of the disc 37 so as to constitute a frictional brake therefor.

Adjacent the centering member 39 and concentric therewith the insulating member 48 is pressed into a groove so as to be flush with the upper surface of said disc, the said insulation being itself grooved and provided with a preferably copper contact ring or washer element 49.

*The wiring*

This is diagrammatically shown in general, in Figs. 1 and 2 wherein, the wire 29 leads from one pole of the battery 58 into the space A which it traverses so as to connect all four said solenoids in series and then leads to the pole element 49, while the wire 51 leads from the terminal 59 to said battery, in which present disposition of parts the circuit is shown as being open.

While in Fig. 12 the bell-crank 18—19 serves as operative means for the latch 7; so, in Fig. 14 the upward movement of the wedge 52 acting on the roller 53 having the axis 54 provides another efficient means for retracting said latch, where as the spring 55 projects said latch to the locked position when not under the influence of the wedge 52.

The operation

It will be readily understood that while the car is running under usual road conditions the disc 37 will remain in its normal position with relation to the contact element 49 and that such vertical disturbances as occur from inequalities of road surface will have no tendency to alter the concentricity of said disc; however, it is obvious that whenever the running car is brought to a sudden standstill or whenever the car receives a sudden jolt by a force moving in a horizontal plane the disc 37 will react and be displaced so as to force the centering members 39 and 39a up into their respective socket members 40 and 40a by compressing the springs 41—41, thus allowing the disc 37 to roll between the balls 46b until the rounded point of the member 39 makes electrical contact with the element 49 closing the solenoids 12, lifts the armatures 14—15 releasing the latches 7, whereupon, the springs 8, being under compression are free to act and drive the releasable frame 5 forward away from the car, carrying the windshield frame 4 and the glass 3 mounted thereon with it in such manner that occupants of the car if thrown violently forward would be projected into the vacant opening bounded by the stationary supporting frame 1 instead of being thown through the glass 3 at peril of their lives.

Obviously, this same releasable means could be applied to doors and windows and other openings as well as to windshields.

It is believed that the construction, operation and advantages of the invention will now be clearly understood. The present embodiments of the invention have been disclosed in detail merely by way of example, since in actual practice they attain the features of advantage set forth as being desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. A windshield apparatus comprising a relatively stationary supporting frame and a relatively movable frame adapted to engage the supporting frame in front of same, a transparent windshield member carried by the latter frame, the frames conformed to enclose a tubular space when engaged, releasable latch-engagement means and spring means within said space adapted to force the movable frame away from the stationary frame when the latch means is released.

2. A windshield apparatus for a vehicle comprising a stationary and a movable frame member, a windshield member carried by the movable frame, said frames conformed so that when engaged a tubular space is enclosed, compression spring means within the space, means for releasably engaging said frame, release means therefor adapted to be actuated by the displacement of a weight member carried by said vehicle.

3. A windshield apparatus for a vehicle comprising a releasable frame carrying a windshield, a stationary frame mounting said releasable frame, said frames enclosing a tubular space extending around said frames, spring means for thrusting the frames apart, latches for holding said frames together and a magnetic element or elements adapted to actuate said latches for the release of the releasable frame.

4. In an apparatus of the kind described, comprising a windshield having stationary releasable frame members and means for engaging the one with the other, said frames enclosing a tubular space, electro-magnetic elements within said space and adapted when energized to release said means of engagement.

5. In an apparatus of the kind described, having a member co-operating with a stationary releasable member for mounting a windshield, latch means engaging said members, electro-magnet element or elements carried by the stationary member and adapted to be energized by the movement of a weighted body which when dislocated by shock closes an electric circuit.

6. In an apparatus of the kind described comprising a magnetically releasable windshield frame, a switch member comprising a body carrying one pole of an electric circuit, said body being normally out of circuit but which, when dislocated by shock moves so as to close the circuit and thereby energize magnets for the release of said windshield.

In testimony whereof I have hereunto set my hand this 1st day of February, 1928.

GEORGE MAEHREN.